US009793658B2

(12) United States Patent
Hogan et al.

(10) Patent No.: US 9,793,658 B2
(45) Date of Patent: Oct. 17, 2017

(54) REUSE OF PLUG DETECTION CONTACTS TO REDUCE CROSSTALK

(71) Applicant: Apple Inc., Cupertino, CA (US)

(72) Inventors: Roderick B. Hogan, San Francisco, CA (US); Joseph C. Curcio, San Jose, CA (US); Nathan Johanningsmeier, San Jose, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 14/641,276

(22) Filed: Mar. 6, 2015

(65) Prior Publication Data

US 2015/0349464 A1 Dec. 3, 2015

Related U.S. Application Data

(60) Provisional application No. 62/006,259, filed on Jun. 1, 2014.

(51) Int. Cl.

| | |
|---|---|
| ***G06F 13/12*** | (2006.01) |
| ***G06F 13/38*** | (2006.01) |
| ***H01R 13/703*** | (2006.01) |
| *H01R 24/58* | (2011.01) |
| *H01R 107/00* | (2006.01) |
| *H04R 1/10* | (2006.01) |

(52) U.S. Cl.

CPC ......... *H01R 13/7039* (2013.01); *H01R 24/58* (2013.01); *H01R 2107/00* (2013.01); *H04R 1/1041* (2013.01); *H04R 2420/05* (2013.01); *H04R 2420/09* (2013.01)

(58) Field of Classification Search

None

See application file for complete search history.

(56) References Cited

U.S. PATENT DOCUMENTS

| | | | | |
|---|---|---|---|---|
| 7,961,895 B2 * | 6/2011 | Wu | H04R 1/04 | 381/113 |
| 8,243,945 B2 * | 8/2012 | Li | H01R 13/7032 | 381/309 |
| 8,811,647 B2 * | 8/2014 | Hansson | H04R 1/1033 | 381/379 |
| 2008/0112572 A1 * | 5/2008 | Wong | H04R 1/1041 | 381/74 |
| 2012/0019309 A1 * | 1/2012 | Turner | H03K 5/1254 | 327/524 |

(Continued)

*Primary Examiner* — Elias Mamo

(74) *Attorney, Agent, or Firm* — Kilpatrick Townsend & Stockton LLP

(57) ABSTRACT

An audio jack may include two contacts to electrically connect to a ground contact of an audio plug in order to detect that a metallic audio plug is inserted into the audio jack. A first of these two contacts may be grounded to form a current return path that generates a ground voltage at the ground contact of the audio plug. The second of these two contacts may be repurposed after the detection to sense the ground voltage. The sensed ground voltage may be added to right and left audio signals. The net voltages provided to the audio plug may be right and left audio signals that include the sensed ground voltage minus the actual ground voltage at the ground contact of the audio plug. This may remove the ground voltage from the net audio output signals, which may reduce crosstalk.

21 Claims, 10 Drawing Sheets

(56) References Cited

U.S. PATENT DOCUMENTS

| | | | | |
|---|---|---|---|---|
| 2013/0108064 | A1* | 5/2013 | Kocalar ......... | G01R 31/318572 381/58 |
| 2014/0038460 | A1* | 2/2014 | Lee ...................... | H04R 29/004 439/620.01 |

* cited by examiner $R_L' = R_{HS1} + R_{CNT1} + R_L$ $R_R' = R_{HS2} + R_{CNT2} + R_R$ $R_{MIC}' = R_{CNT4} + R_{MIC}$ $R_L' = R_{HS1} + R_{CNT1} + R_L$ $R_R' = R_{HS2} + R_{CNT2} + R_R$ $R_{MIC}' = R_{CNT4} + R_{MIC}$

REUSE OF PLUG DETECTION CONTACTS TO REDUCE CROSSTALK

CROSS-REFERENCES TO RELATED APPLICATIONS

This application claims the benefit of U.S. patent provisional patent application No. 62/006,259, filed Jun. 1, 2014, which is incorporated by reference.

BACKGROUND

Electronic devices, such as portable media players, storage devices, tablets, netbooks, laptops, desktops, all-in-one computers, cell, media, and smart phones, televisions and other display devices, navigation systems, and other devices have become ubiquitous in recent years. These devices often include an audio jack through which the devices may receive and/or provide audio information. The audio jacks may include, or be connected to, electronic circuitry such as audio drivers for driving headphones or speakers, audio receivers for receiving audio signals from a microphone, and others. The audio jacks may be arranged to receive audio plugs that may be connected through audio cables to other electronic circuits such as home stereos, powered speakers, headphones or headsets, audio receivers, and other circuits.

These audio plugs may be electrical audio plugs. That is, they may include a number of ring-shaped contacts along their lengths. These contacts may connect to conductors in an audio cable attached to the audio plug. Contacts for three-pole audio plugs may include left audio, right audio, and ground. Contacts for four-pole audio plugs may include contacts for left audio, right audio, ground, and microphone.

These four-pole audio plug contacts may be configured in a conventional manner. That is, a tip of the audio plug may be a left audio channel contact, followed by a right audio channel, ground, and microphone contacts.

However, some four-pole audio plugs may be configured in an alternate manner. While the tip and following contacts remain a left audio channel contact and a right audio channel contact, the last two contacts are reversed relative to the conventional audio plug. Specifically, the next contact is a microphone contact, followed by ground.

In each of these configurations, a connection between a contact in an audio jack and a corresponding contact in an audio plug may be resistive. Also, the contacts themselves may be resistive. Return current may flow at the ground contacts. The return current flowing through the contact resistance may generate a voltage. This voltage on ground may generate crosstalk between left and right channels of an audio headset.

Thus, what is needed are circuits, methods, and apparatus for grounding contacts in an audio jack that may reduce this crosstalk.

SUMMARY

Accordingly, embodiments of the present invention may provide circuits, methods, and apparatus for grounding contacts in an audio jack to reduce crosstalk. An illustrative embodiment of the present invention may provide an audio circuit including an audio jack to receive an audio plug. The audio jack may have first and second contacts to form separate electrical connections with a first contact of the audio plug when the plug is inserted in the jack. The first audio jack contact may be connected to ground and the second audio jack contact may be connected to a plug detect circuit. Once a plug is detected, the second audio jack contact may be repurposed as a ground sense line. The sensed ground voltage may then be added to audio output signals provided to contacts of the audio plug in order to cancel the ground voltage from the net audio output signals provided to the audio plug.

More specifically, the first and second contacts in the audio jack may connect to a plug detect circuit to determine if a metallic plug has been inserted. When the first and second contacts in the audio jack are electrically connected to each other through the first contact on the audio plug, the plug detect circuit may determine that an electrical or conductive audio plug has been inserted in the audio jack. (If a plug has been inserted but is not conductive, it may be an optical audio plug.) Once this determination has been made, the second contact may be repurposed and used as a ground sense line.

The net audio signals received by an audio plug are equal to the differences in signals at a left contact of the audio plug and a ground contact of the audio plug, and a right contact of the audio plug and the ground contact of the audio plug. This means that any voltage at the ground contact of the audio plug could become part of the net audio signals. These net audio signals are the audio signals that will be provided over headphones, amplified over speakers, or otherwise heard by a user. Accordingly, embodiments of the present invention may cancel this ground voltage from the net audio signals. For example, embodiments of the present invention may sense the ground voltage at the audio plug and add the sensed ground voltage to the signals provided to the left and right contacts. In this way, the voltage at the ground contact may be cancelled (or at least reduced) from the net audio signals provided to the audio plug.

A voltage may arise at the ground contact of the audio plug since electrical connections between the first and second contacts of the audio jack and the first contact of the plug may be resistive. Again, the first contact of the audio jack may be connected to ground. Return currents passing through this connection to ground may generate a ground voltage, which may be referred to as ground noise. Since this ground noise is subtracted from signals at the right and left contacts of the audio plug to generate net audio signals, the ground noise may become part of the net left and right audio signals. Since ground noise caused by one audio channel may be subtracted from the other audio channel, the ground noise may result in crosstalk between the audio channels. By adding the sensed ground noise to the left and right audio signals, the ground noise may be cancelled when the ground noise is subtracted to generate the net audio signals. This may help to reduce crosstalk between the audio channels.

The ground noise may be added to the left and right audio signals in various ways. For example, summing nodes may be placed between outputs of the left and right audio circuits and the audio jack contacts. A first summing node may add the left audio signal and the sensed ground voltage, while a second summing node may add the right audio signal and the sensed ground voltage. In other embodiments of the present invention, one or more audio output amplifiers may receive the sensed ground voltage as an input. The audio output amplifiers may then amplify the right and left audio signals and add the sensed ground voltage to the amplified signals. It should be noted that for improved cancellation of the ground voltage or noise, the bandwidth of the summing node path should exceed the frequencies of ground voltage or noise to be reduced or cancelled. If the bandwidth is too low, excessive phase shift in the sensed ground noise may occur leading to a degraded level of noise reduction or cancellation.

Again, various audio plugs may have different placements of contacts. For example, a three-pole plug may have a left, right, and then a ground contact. Four pole plugs may have left, right, ground, and then a microphone, or alternatively, left, right, microphone, and then a ground contact. Accordingly, in various embodiments of the present invention, the above contacts may be placed in an audio jack to align with a contact on the plug in the third position. With this configuration, ground noise may be cancelled or reduced when a plug has a left, right, and ground configuration, and when a plug has a left, right, ground, and microphone configuration.

In other embodiments of the present invention, the above contacts may be placed in an audio jack to align with a contact on the plug in the fourth position. With this configuration, ground noise may be cancelled or reduced when a plug has a left, right, and ground configuration, or a left, right, microphone, and ground configuration.

In still other embodiments of the present invention, the above contacts may be placed in an audio jack to align with a contact on the plug in the third position and then duplicated or repeated in the fourth position. That is, an additional contact may be placed in the fourth position. With this configuration, ground noise may be cancelled or reduced when a plug has any of the above configurations.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1A:
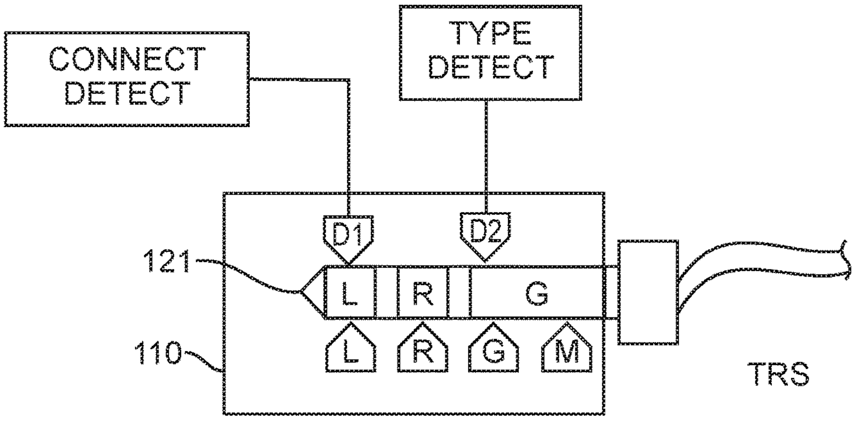
FIGS. 1A-1C illustrate various audio plugs that may be received by an audio jack according to an embodiment of the present invention.
Figure 1B:
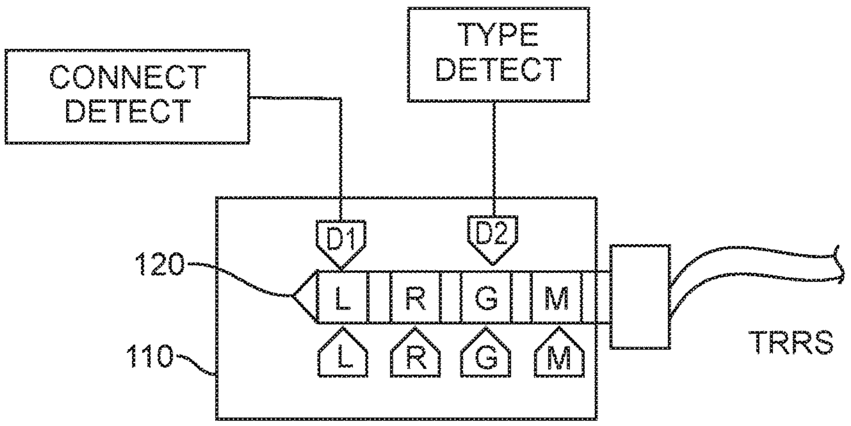
Figure 1C:
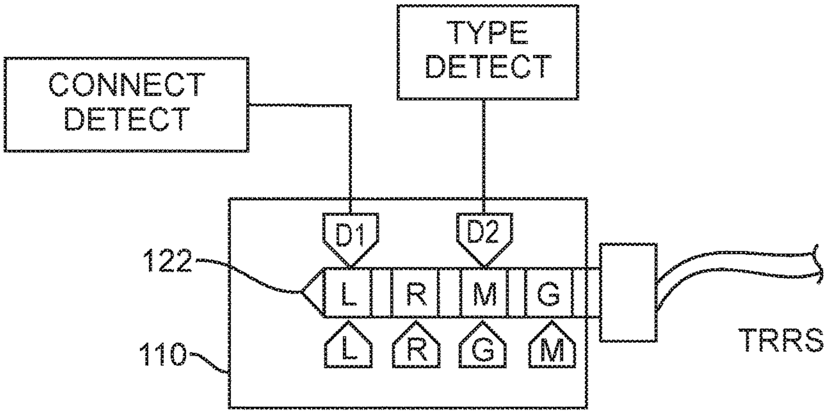

FIGS. 1A-1C illustrate various audio plugs that may be received by an audio jack according to an embodiment of the present invention. This figure, as with the other included figures, is shown for illustrative purposes and does not limit either the possible embodiments of the present invention or the claims.

In FIG. 1A, plug 121 may have a left, right, and ground contact. This type of plug may be referred to as a TRS plug, where TRS stands for tip, ring, and sleeve. Audio jack 110 may include contacts for the left (L), right (R), and ground (G) contacts. In various embodiments of the present invention, the audio jack may further include a microphone (M) contact. When a microphone contact is included, both ground and microphone contacts of the audio jack 110 may form an electrical connection with the ground contact on the audio plug 121.

Audio jack 110 may further include, or be associated with, other circuits. For example, a connect-detect circuit may connect to a contact D1 in audio jack 110. The connect-detect circuitry may also connect to the left contact of the audio jack, though this connection is not shown for simplicity. The connect-detect circuitry may detect that a plug has been inserted. Type-detect circuitry may connect to contact D2 of the audio jack 110. The type-detect circuitry may also connect to the ground contact of the audio jack, but this extra connection is not shown for simplicity. The type-detect circuit may detect whether the inserted plug is an electrical audio plug or an optical audio plug. Contact D2 may be aligned to connect to the same contact on audio plug 121 as the ground contact of the audio jack 110.

In FIG. 1B, the plug 120 may have a left, right, ground, and microphone contact. This type of plug may be referred to as a TRRS plug, where TRRS stands for tip, ring, ring, and sleeve. Again, a connect-detect circuit may connect to a contact D1 in audio jack 110. The connect-detect circuit may also connect to the left contact of the audio jack. Type-detect circuitry may connect to contact D2 of the audio jack 110. The type-detect circuitry may also connect to the ground contact of the audio jack, but as before these extra connections are not shown for simplicity.

In FIG. 1C, the plug 122 may have a left, right, microphone, and ground contact. This type of plug may also be referred to as a TRRS plug, where again TRRS stands for tip, ring, ring, and sleeve. Again, a connect-detect circuit may connect to a contact D1 in audio jack 110. The connect-detect circuitry may also connect to the left contact of the audio jack. Type-detect circuitry may connect to contact D2 of the audio jack 110. The type-detect circuitry may also connect to the ground contact of the audio jack, but again these extra connections are not shown for simplicity.

In various embodiments of the present invention, different types of audio jacks may be used for audio jack 110. An example is shown in the following figure.

Figure 2:
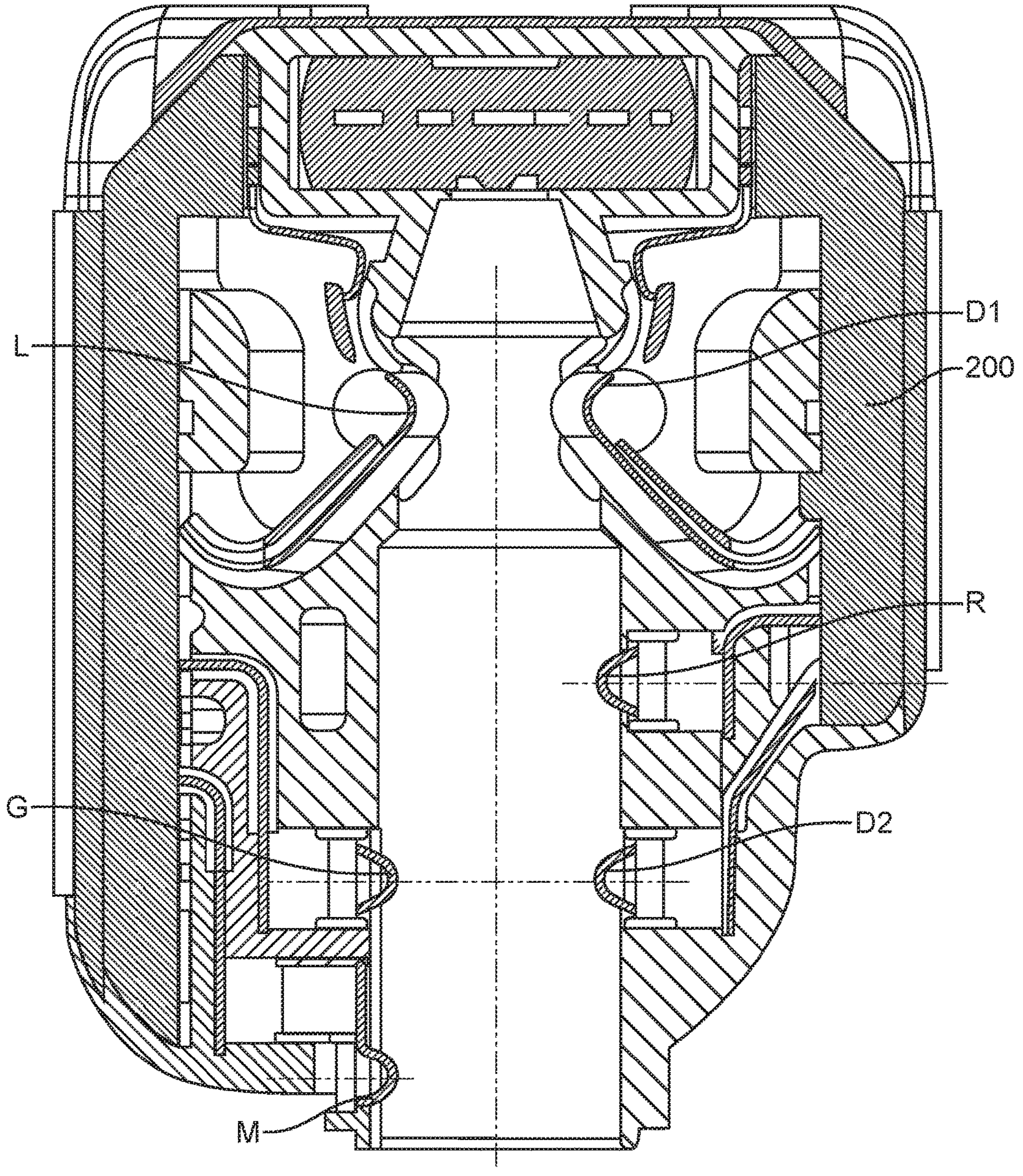
FIG. 2 illustrates an audio jack that may be used as an audio jack in embodiments of the present invention.

FIG. 2 illustrates an audio jack that may be used as audio jack 110 or as an audio jack in other embodiments of the present invention. This audio jack may include a housing 200 supporting left (L), right (R), ground (G), and microphone (M) contacts. Detect contacts D1 and D2 are also included. In various embodiments of the present invention, the left and D1 contacts may be reversed from their shown positions. In these and other embodiments of the present invention, the ground and D2 contacts may be similarly reversed.

When these contacts form electrical connections with contacts on an audio plug, the resulting electrical connections may be resistive. Currents flowing in these resistances may generate voltages. These voltages may generate crosstalk. Specifically, noise from a left channel may be coupled to a right channel, while noise from a right channel may be coupled to a left channel. This crosstalk may interfere with the quality of the sound reproduction through the audio circuitry. An example of how this crosstalk may be generated is shown in the following figure.

Figure 3:
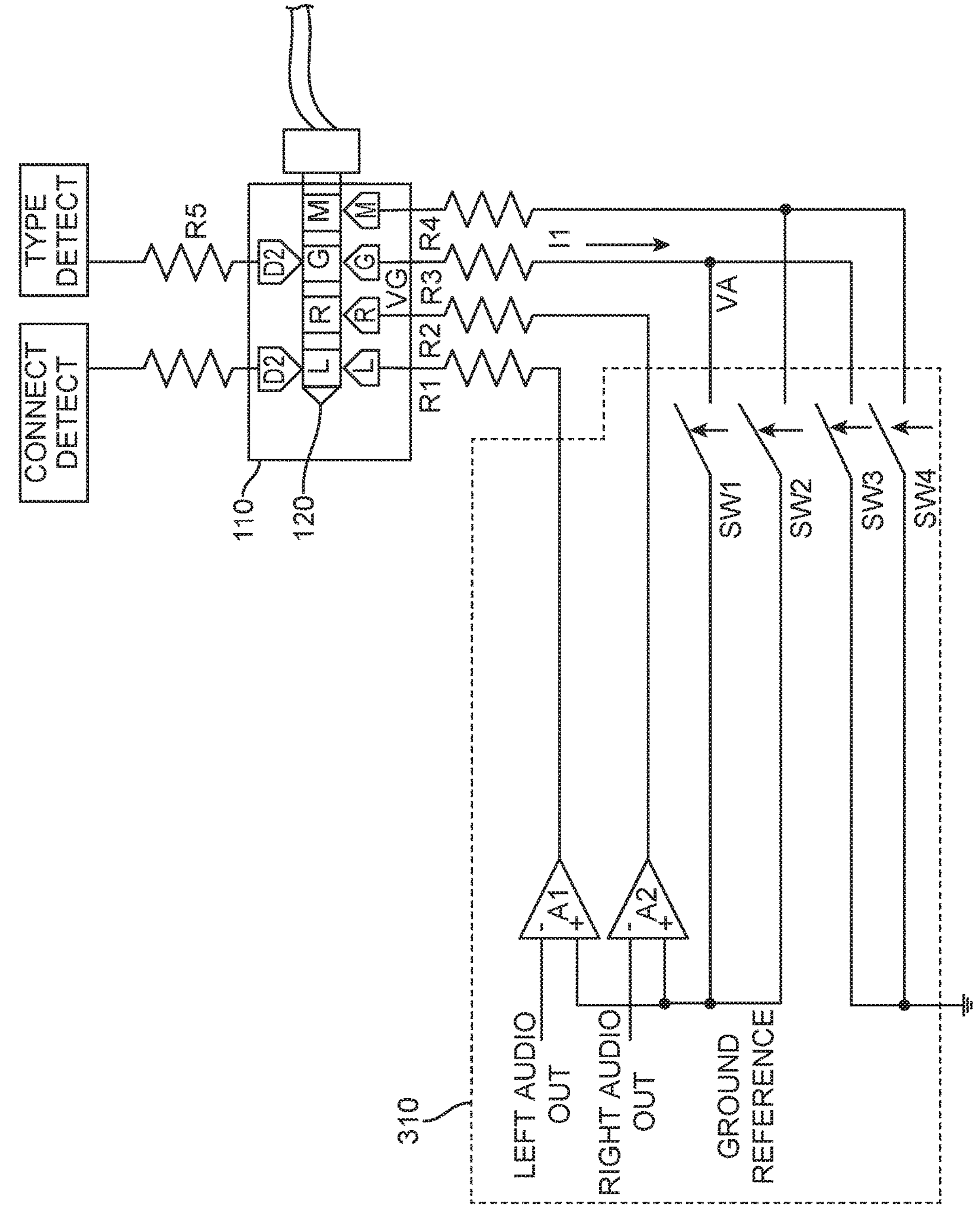
FIG. 3 illustrates audio circuitry that may be improved by the incorporation of an embodiment of the present invention.

FIG. 3 illustrates audio circuitry that may be improved by the incorporation of an embodiment of the present invention. In this example, an audio output circuit and four switches S1-S4 may be located on an integrated circuit 310. Connect-detect and type-detect circuits may be included on this circuit as well. Audio jack 110 may be connected to integrated circuit 310. Contact resistance between contacts in audio jack 110 and audio plug 120 may be modeled as resistances R1-R5.

When audio plug 120 is initially inserted into audio jack 110, circuitry on integrated circuit 310 may make a number of determinations. For example, a connect-detect circuit may detect that plug 120 has been inserted into audio jack 110. A type-detect circuit may determine that a metallic audio plug 120 has been inserted. This may be done by determining whether contacts for D2 and ground (G) are shorted together. It should be noted again that in these examples, the connection between the type-detect circuitry and the ground contact (G) of the audio jack is omitted for clarity. Also, it may be determined whether a three-pole plug or a four-pole plug is present, and if it is a four pole plug, which version of four-pole plug that has been inserted may be determined. In this example, a plug having left, right, ground, and then microphone contacts has been inserted. Accordingly, switch SW3 may close, forming a ground path from the ground contact on audio plug 120, through the ground contact on the audio jack and its associated resistance R3, switch SW3, and then to ground. Also, switch SW1 may close connecting this ground path to the ground reference for audio output amplifiers A1 and A2.

In this configuration, current I1 may flow through contact resistance R3 and a resistance of switch SW3 (not shown) generating a voltage VG relative to ground. This voltage VG may generate crosstalk between the left and right audio channels. This is because the net right and left signals received by the audio plug are not simply the signals at the right and left contacts. Instead, the net audio output signals may be equal to the difference in voltages provided to the right channel plug contact (R) and the ground plug contact (G), and the difference in voltages provided to the left channel plug contact (L) and the ground plug contact (G). The voltage at the ground plug contact is VG, so the output signals may each have VG as a component. In this way, the presence of VG may cause crosstalk.

As an example, if no signal is provided on the right audio output while a signal is provided on the left audio output, a resulting current I1 and voltage VG that is proportional to the left audio output may be generated. This voltage is subtracted from the right audio output signal provided by amplifier A2 to generate a net right audio output signal at the contacts of the audio plug. The net right audio output signal may then have a VG component, which may be crosstalk on the right channel due to a signal on the left channel.

To reduce this crosstalk, embodiments of the present invention may sense a voltage on the ground contact of the audio plug and add it to the left and right audio signals. In an embodiment of the present invention, this may be done by repurposing the type-detect pin D2 as a ground voltage sense line after the type detection has been completed. This solution may enable crosstalk to be reduced for some plug configurations without adding contacts to the audio jack. In one embodiment of the present invention, crosstalk may be reduced when plugs having a left, right, and ground, or a left, right, ground, and microphone contact arrangement is used. An example is shown in the following figure.

Figure 4:
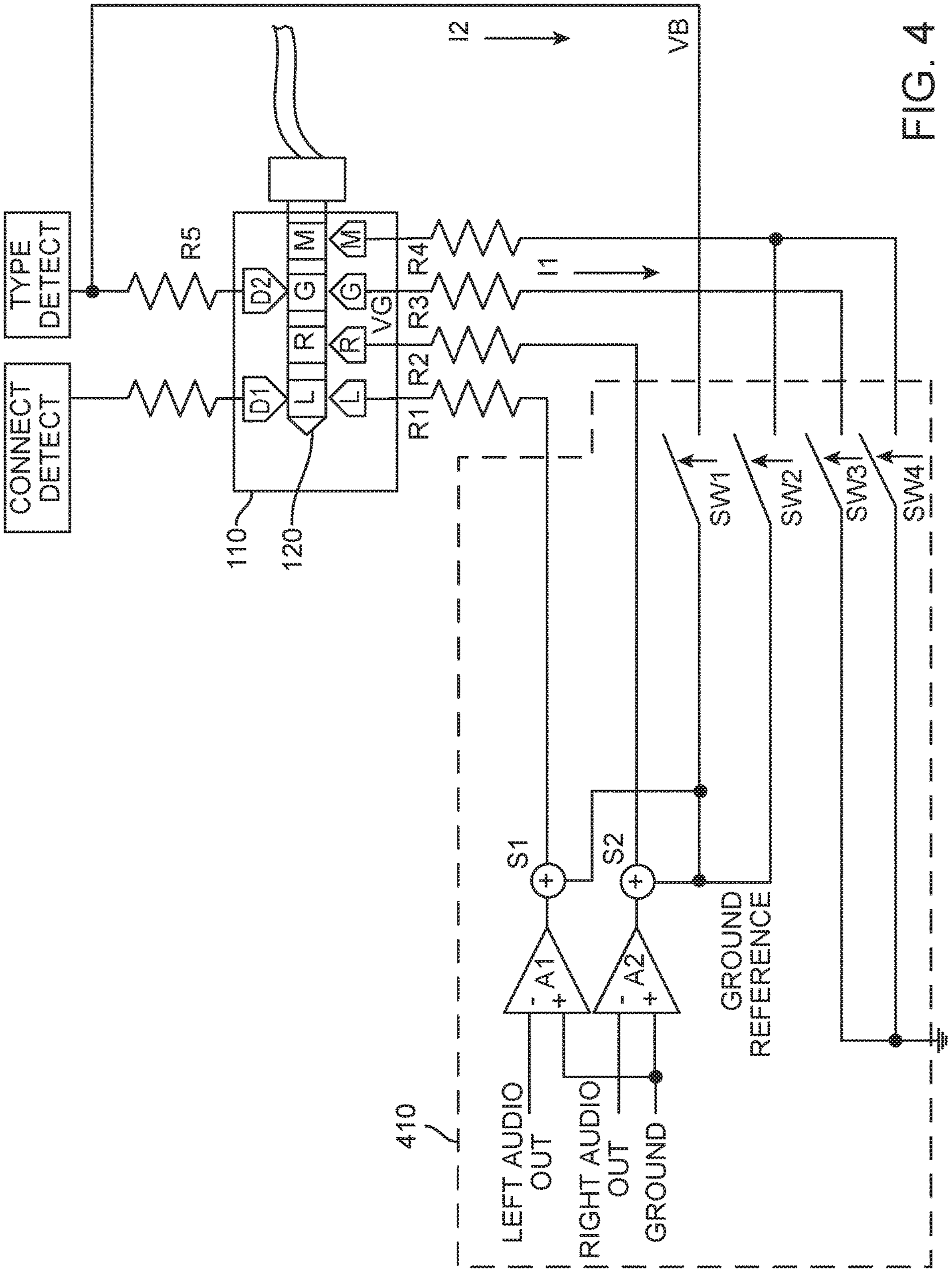
FIG. 4 illustrates audio circuitry according to an embodiment of the present invention.

FIG. 4 illustrates audio circuitry according to an embodiment of the present invention. In this example, audio output amplifiers A1 and A2, summing nodes S1 and S2, as well as switches SW1-SW4, the connect-detect, and type-detect circuitry may be located on an integrated circuit that is coupled to audio jack 110. Audio input circuitry may be included in this and the other examples as well. The audio input circuitry may include ground connections that may be generated using the same or similar methods. Lines shown crossing the outer boundary of integrated circuit 410, and the other integrated circuits in these examples, may correspond to pins on an integrated circuit.

When plug 120 is inserted, the connect-detect circuitry may determine that plug 120 has been inserted into the audio jack 110. The detect-connect circuit may check if the D2 and ground contacts in the audio jack are electrically connected together through the plug ground contact. This may indicate that a metallic or otherwise conducive plug 120 has been inserted. Following that, it may be determined whether a plug is a three pole or four pole plug, and if it is a four pole plug, it may be determined which type of four pole plug it is. In this case, it may be determined that a four pole plug 120 having left, right, ground, and microphone contacts has been inserted.

As before, switch SW3 may close, thereby providing a ground path from the ground contact of the plug 120 through switch SW3 to ground. Again, a current I1 may be generated, which may flow through the resistance of switch SW3 (not shown) and the contact resistance R3 to produce a voltage VG relative to the ground on the integrated circuit 410.

In this embodiment of the present invention, the voltage VG may be sensed and added to the outputs of amplifiers A1 and A2. In this way, the left and right voltages at the audio plug include VG. Since the net right and left audio signals are the signals at the right and left pins minus the ground voltage VG, the ground voltage VG is removed from the net right and left audio signals. This may reduce crosstalk between the left and right audio channels.

In an embodiment of the present invention, the type-detect pin D2 may be repurposed to sense a ground voltage and provide it to a summing node after the type of plug has been detected. Specifically, switch SW1 may close. The sensed voltage at D2 may be approximately equal to the ground voltage VG. The current I2 may be very small such that the voltage drop across R5 is minimal. I2 may be kept small by designing summing nodes S1 and S2 to have a high input impedance. Since the drop across R5 is small, VB may be approximately equal to VG. That is, VB may provide a sensed ground voltage. The sensed ground voltage VB may be provided to the summing nodes S1 and S2. In this way, the voltage VG may be sensed using the contact D2 and the sensed ground voltage may be provided as an input to the summing nodes S1 and S2.

The sensed ground voltage VB may be added to the output signals from amplifiers A1 and A2. The net left audio signal at the audio plug may be the voltage at the left contact (L), which is the output of A1 plus VG, minus the voltage VG at the ground contact (G). Similarly, the net right audio signal at the audio plug may be the voltage at the right contact (R), which is the output of A2 plus VG, minus the voltage VG at the ground contact (G). In this way, the audio signal components caused by VG are at least reduced or cancelled and crosstalk is at least reduced or cancelled.

As an example, if no signal is provided on the right audio output while a signal is provided on the left audio output, a resulting current I1 and voltage VG that is proportional to the left audio output may be generated. This voltage VG may be sensed at contact D2 and added to the right and left audio signals. This voltage VG is subtracted from the right audio output signal provided by amplifier A2 to generate a net right audio output signal at the contacts of the audio plug. The net right audio output signal may then have its VG component removed, which may remove crosstalk on the right channel due to a signal on the left channel.

In this example, the sensed ground voltage is added to right and left audio signals using summing nodes S1 and S2. In other embodiments of the present invention, these signals may be combined using other circuits. For example, amplifier A1 and summing node S1 may be combined into a single amplifier and amplifier A2 and summing node S2 may be combined into a single amplifier.

In various embodiments of the present invention, the noise VA may be reduced by reducing the impedances of switches SW3 and SW4. In various embodiments of the present invention, this may be done by using different types of transistors, micro-electro-machines, relays, or other types of devices, circuits, or switches. These devices may be used for the various switches described here and other switches in other embodiments of the present invention. Examples of these devices that are used in related circuitry may be found in co-pending U.S. patent application Ser. No. 13/492,900, titled GROUNDING CIRCUIT FOR ALTERNATE AUDIO PLUG DESIGNS, filed Jun. 10, 2012, and 62/006,252, titled GROUNDING CIRCUIT FOR ALTERNATE AUDIO PLUG DESIGNS, filed Jun. 1, 2014, which are incorporated by reference.

Figure 5:
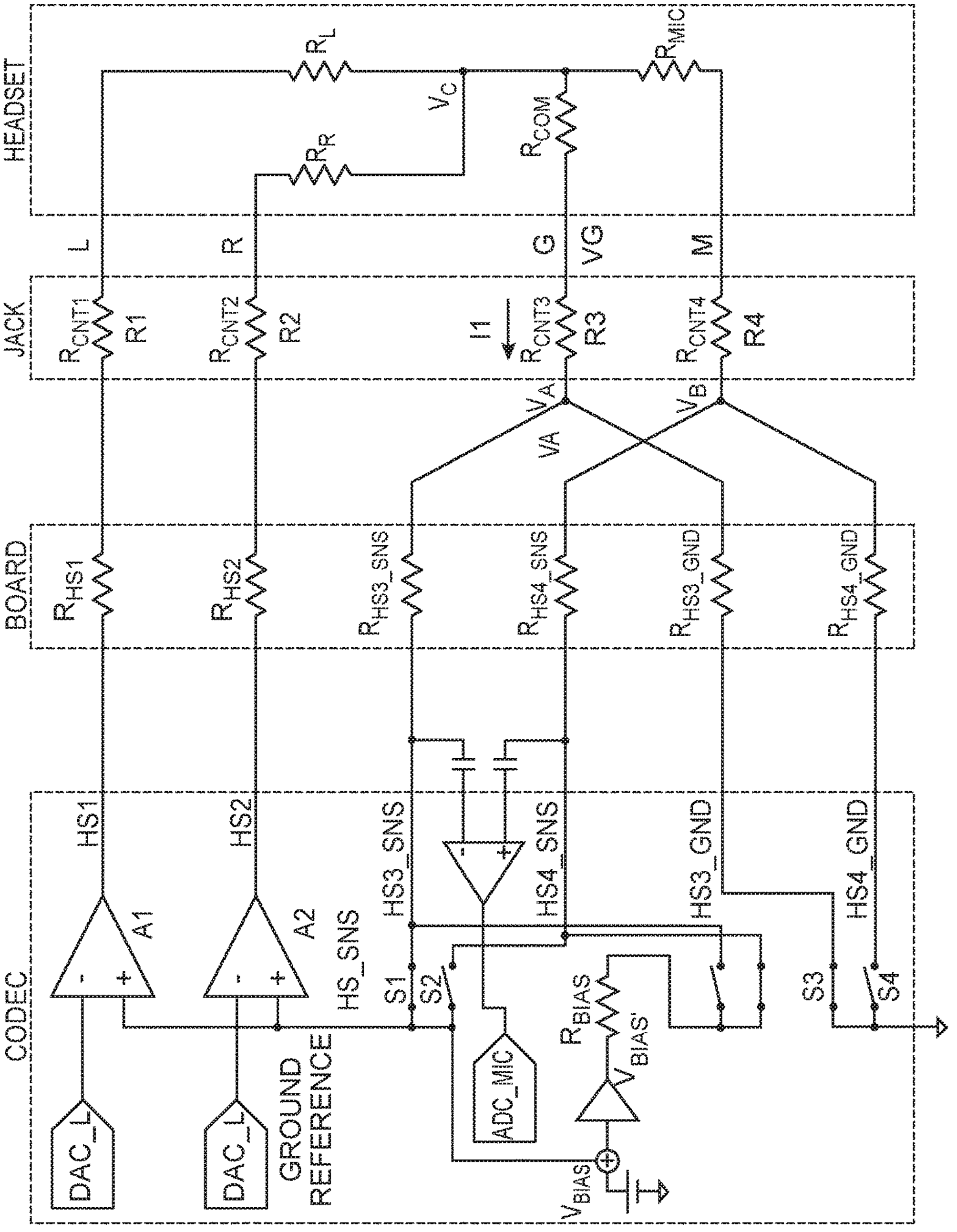
FIG. 5 illustrates a more detailed view of the circuitry of FIG. 3.

FIG. 5 illustrates a more detailed view of the circuitry of FIG. 3. In this example, circuitry in a CODEC is shown. Parasitic resistances of board traces and resistances in a headset are also included. As before, switch SW3 may close providing a ground path from the ground contact in the audio jack to ground. The current I1 may flow in this path, thereby generating voltages VA and VG. The voltage VA may couple through switch SW1 to inputs of audio amplifiers A1 and A2. The voltage VG may be subtracted from voltages on the right and left contacts on the audio plug to generate net audio signals. The VG component of the left and right audio signals may cause crosstalk, as shown above.

Figure 6:
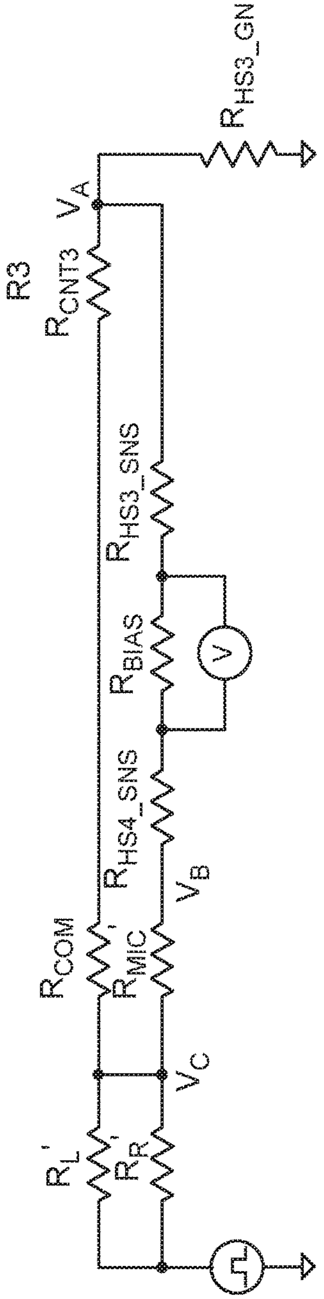
FIG. 6 illustrates an AC model of the resistance path shown in FIG. 5.

FIG. 6 illustrates an AC model of the resistance path shown in FIG. 5. As shown, resistance R3 may be located in an AC signal path. The presence of R3 in this location may cause crosstalk.

Figure 7:
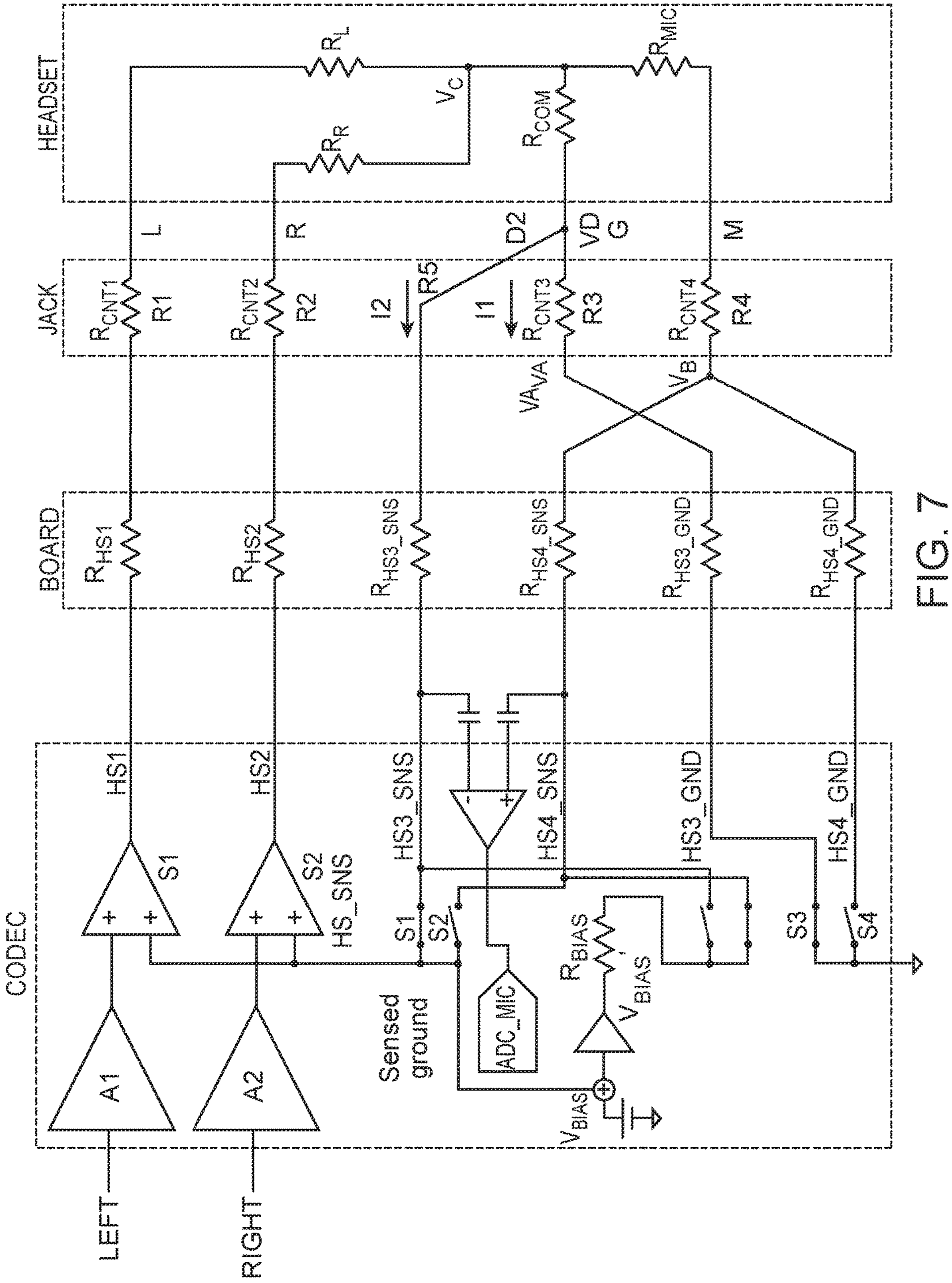
FIG. 7 illustrates a more detailed diagram of the circuitry in FIG. 4.

FIG. 7 illustrates a more detailed diagram of the circuitry in FIG. 4. Again, both D2 and ground contacts in the audio jack may electrically connect to a ground contact on an audio plug. Each of these contacts may have a resistance. Specifically, the contact resistance for the ground contact may be resistance R3, while the contact resistance for D2 may be the resistance R5, which has been omitted for clarity since I2 is very small. Again, the ground contact in the audio jack may be connected to ground through switch SW3. This may cause current I1 to flow through all resistances in the path from the ground contact to ground, thereby generating a voltage VG. In this embodiment of the present invention the sensed ground voltage may be provided from the type-detect contact D2 in the audio jack through switch SW1. The sensed ground voltage may be added to the output of amplifiers A1 and A2 by summing nodes S1 and S2. This addition may cancel or reduce the contribution of voltage VG present at the ground contact of the audio plug to the net audio output signals. Accordingly, crosstalk between the left and right channels may be reduced or cancelled.

Figure 8:
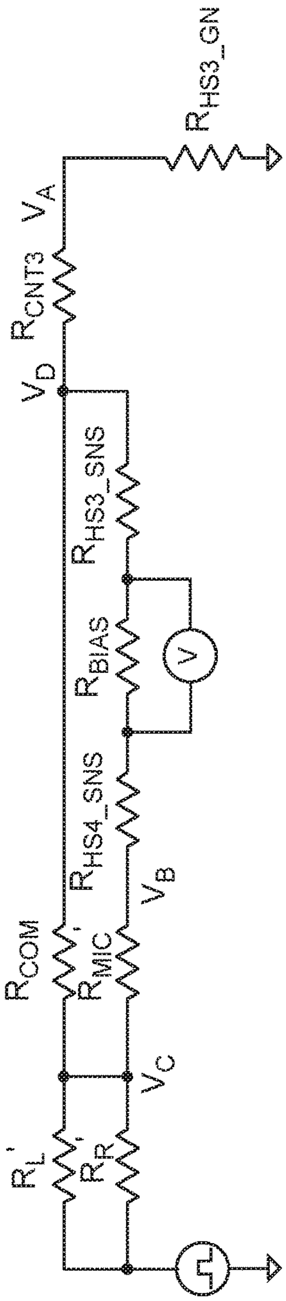
FIG. 8 illustrates an AC model for the circuitry of FIG. 7.

FIG. 8 illustrates an AC model for the circuitry of FIG. 7. In this example, contact resistance R3 is shown as being outside of the noise generating path. This may help to reduce crosstalk.

In other embodiments of the present invention, the type-detect contact D2 may be located in the fourth or final position in the audio jack. By placing the detect type contact in the this position, ground noise may be reduced in situations where an audio plug having left, right, microphone, and then ground contacts is inserted into an audio jack. This configuration may also provide reduction in crosstalk when the audio plug has the left, right, and then ground contact configuration. However this configuration might not provide a reduction in crosstalk with left, right, ground, and microphone arrangements.

In still other embodiments of the present invention, a type-detect contact D2 may be located in either the third or fourth position, and an additional contact may be located in the remaining third of fourth position. This additional contact, referred to as contact "A" may enable the reduction of crosstalk when a three pole plug or a four pole plug of either variety is used. An example is shown in the following figure.

Figure 9:
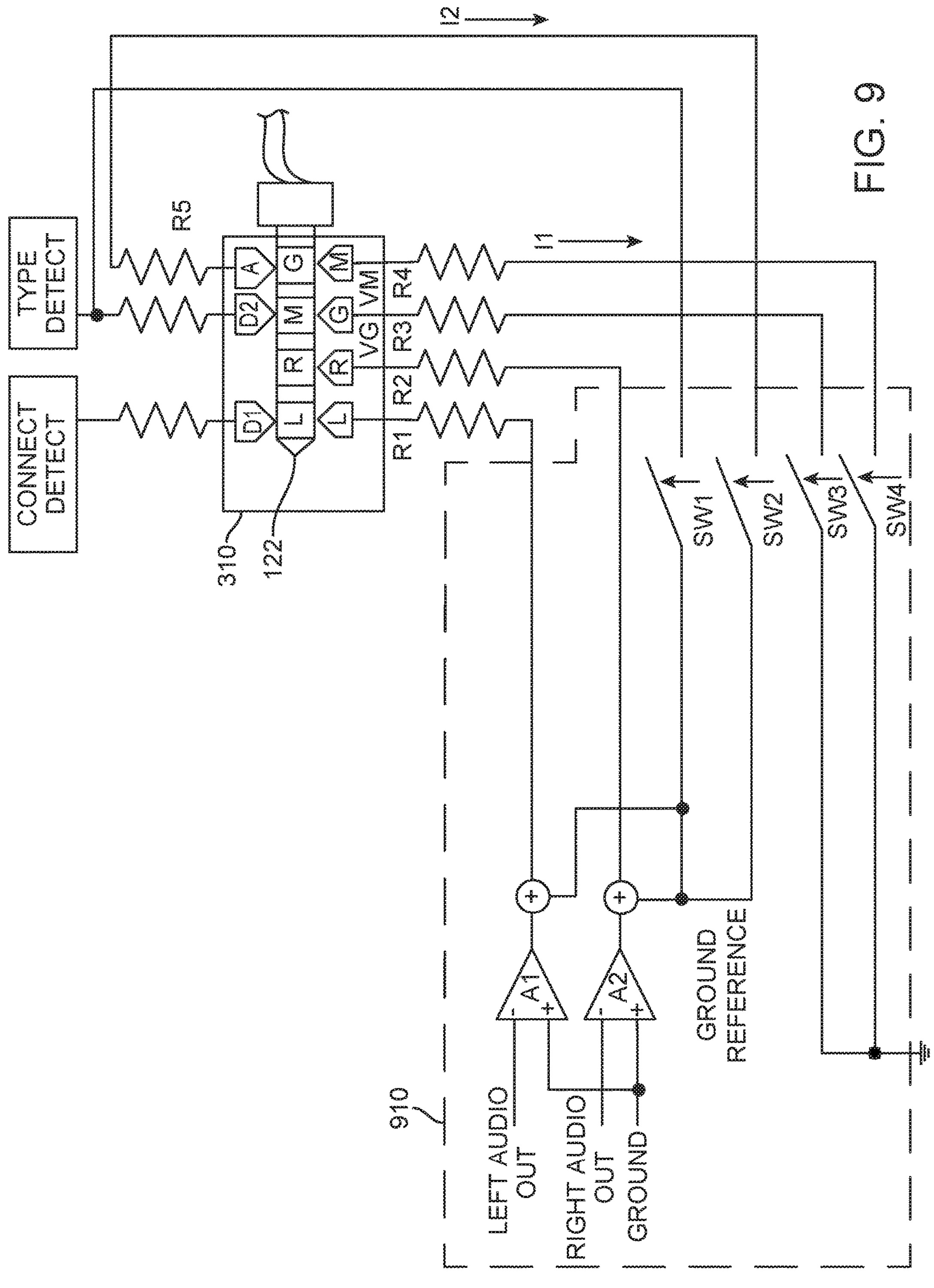
FIG. 9 illustrates an audio jack and related circuitry according to another embodiment of the present invention.

FIG. 9 illustrates an audio jack and related circuitry according to an embodiment of the present invention. In this example an audio plug 122 having left, right, microphone, and ground contacts may be inserted in audio jack 310. A ground connection from the ground contact (G) on audio plug 122 may be formed through switch SW4 to ground. This may cause a current I1 to flow through resistance R4, thereby generating voltage VM. An additional contact A may be included in audio jack 112. This additional contact A may have a resistance R5. A current I2 may flow through resister R5 and switch SW2 to the ground reference for the audio output circuitry. A voltage generated by current I2 across resistance R5 may be minimal. This may allow the ground voltage VM to be sensed and provided to summing nodes S1 and S2. Summing nodes S1 and S2 may add the sensed ground voltage VM to the left and right audio output signals. This configuration may reduce crosstalk when a three pole or for pole plug of either variety is used.

Figure 10:
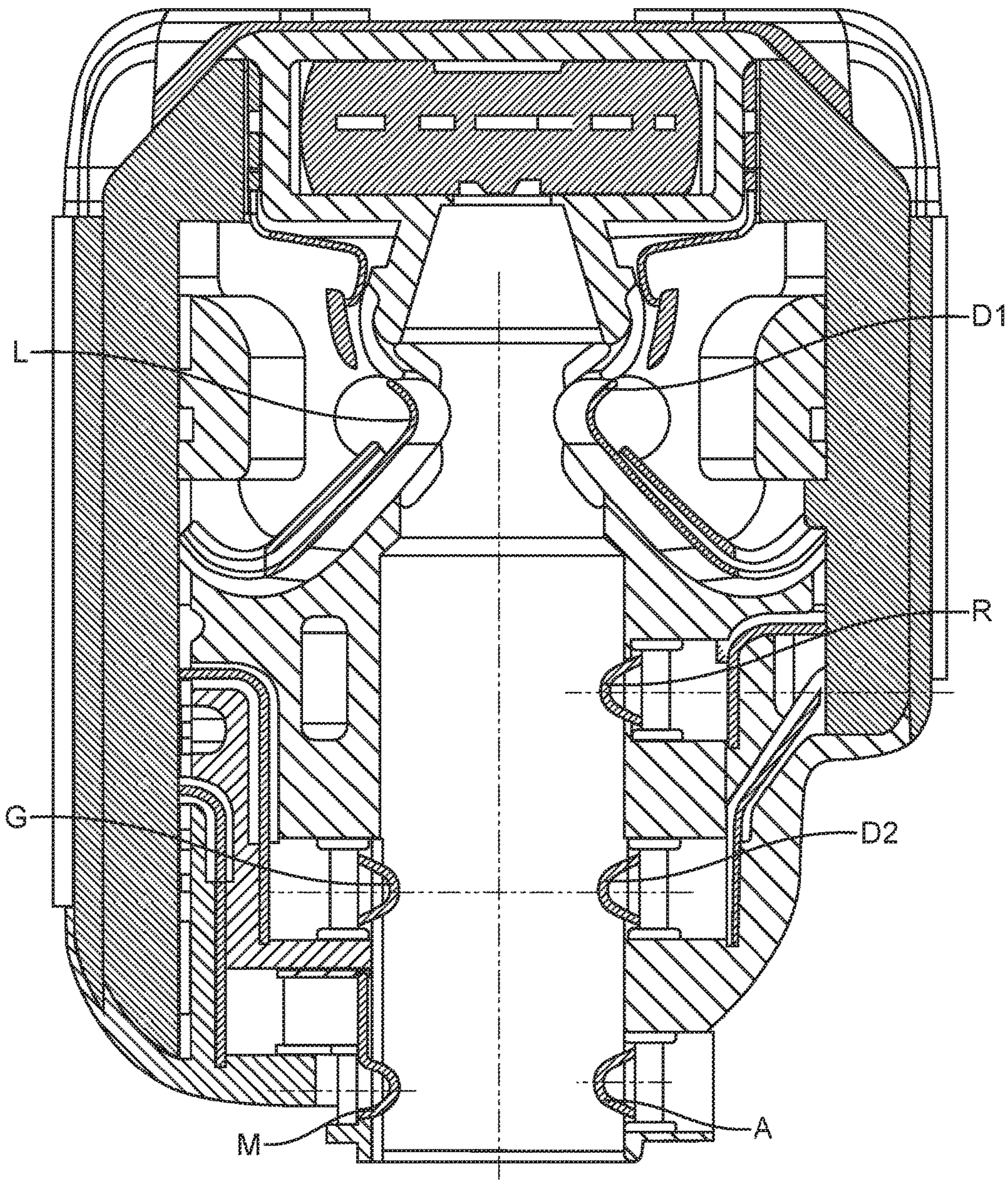
FIG. 10 illustrates an audio jack that may be used as an audio jack in embodiments of the present invention.

FIG. 10 illustrates an audio jack that may be used as audio jack 112 or as other audio jacks in other embodiments of the present invention. In this example, contact A has been added as compared to the audio jack in FIG. 2. The contacts for the microphone and the additional contact may be reversed from their illustrated positions.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An audio circuit comprising:

an audio jack to receive an audio plug, the audio jack comprising:

a first contact to electrically connect to a first contact on the audio plug;

a second contact to electrically connected to the first contact on the audio plug;

a detect circuit coupled to the first contact and the second contact in the audio jack to determine a type of audio plug inserted in the audio jack; and an audio output circuit coupled to receive a left audio signal and a right audio signal, wherein the first contact in the audio jack is selectively connected to ground and the second contact in the audio jack is selectively connected to the audio output circuit.

2. The audio circuit of claim 1 further comprising:

a third contact in the audio jack to electrically connect to a second contact on the audio plug, the third contact coupled to a left output of the audio output circuit; and a fourth contact in the audio jack to electrically connect to a third contact on the audio plug, the third contact coupled to a right output of the audio output circuit.

3. The audio circuit of claim 2 further comprising:

a fifth contact in the audio jack to electrically connect to a fourth contact on the audio plug; and a sixth contact in the audio jack to electrically connect to the fourth contact on the audio plug, wherein the fifth contact in the audio jack is selectively connected to ground and the sixth contact in the audio jack is selectively connected to the audio output circuit.

4. The audio circuit of claim 2 wherein the second contact in the audio jack is selectively connected to a summing node at an output of the audio output circuit.

5. The audio circuit of claim 2 wherein the first contact of the audio jack is selectively connected to ground through a depletion mode transistor.

6. The audio circuit of claim 2 wherein the first contact of the audio jack is selectively connected to ground through a floating-gate enhancement-mode transistor.

7. The audio circuit of claim 2 wherein the first contact of the audio jack is selectively connected to ground through a micro-electro-mechanical switch.

8. An audio circuit comprising:

an audio jack;

a first circuit having an output coupled to a first contact of the audio jack;

a second circuit having an output coupled to a second contact of the audio jack;

a first switch coupled between ground and a third contact of the audio jack; and a second switch coupled between inputs of the first and second circuits and a fourth contact in the audio jack, wherein the third and fourth contacts are arranged to electrically connect to a same contact on an audio plug when the audio plug is inserted into the audio jack.

9. The audio circuit of claim 8 further comprising:

a detect circuit coupled to the third contact and the fourth contact in the audio jack to determine a type of audio plug inserted in the audio jack.

10. The audio circuit of claim 8 further comprising:

a third switch coupled between ground and a fifth contact of the audio jack; and a fourth switch coupled between inputs of the first and second circuits and a fifth contact in the audio jack, wherein the third and fourth contacts are arranged to electrically connect to a same contact on an audio plug when the audio plug is inserted into the audio jack.

11. The audio circuit of claim 8 wherein the first switch is a depletion mode transistor.

12. The audio circuit of claim 8 wherein the first switch is a floating-gate enhancement-mode transistor.

13. The audio circuit of claim 8 wherein the first switch is a micro-electro-mechanical switch.

14. An audio circuit comprising:

an integrated circuit comprising:

a first summing circuit having a first input for a left audio signal, a second input for a ground reference, and an output coupled to a first pin of the integrated circuit;

a second summing circuit having a first input for a right audio signal, a second input for the ground reference, and an output coupled to a second pin of the integrated circuit;

a first switch coupled between the ground reference and a third pin of the integrated circuit; and a second switch between a fourth pin and a fifth pin of the integrated circuit; and an audio jack comprising:

a first contact coupled to the first pin of the integrated circuit;

a second contact coupled to the second pin of the integrated circuit;

a third contact coupled to the third pin of the integrated circuit; and a fourth contact coupled to the fourth pin of the integrated circuit.

15. The audio circuit of claim 14 wherein the fifth pin of the integrated circuit is grounded.

16. The audio circuit of claim 15 wherein the integrated circuit further comprises:

a third switch between a sixth pin of the integrated circuit and the ground reference; and a fourth switch between a seventh pin of the integrated circuit and the fifth pin of the integrated circuit.

17. The audio circuit of claim 16 wherein the audio jack further comprises:

a fifth contact coupled to the seventh pin of the integrated circuit.

18. The audio circuit of claim 17 wherein the audio jack further comprises:

a sixth contact coupled to the sixth pin of the integrated circuit.

19. The audio circuit of claim 16 wherein the second switch and the fourth switch are depletion-mode transistors.

20. The audio circuit of claim 16 wherein the second switch and the fourth switch are floating-gate enhancement-mode transistors.

21. The audio circuit of claim 16 wherein the second switch and the fourth switch are micro-electro-mechanical switches.

* * * * *